3 Sheets—Sheet 1.

M. CRAWFORD.

GRINDING AND AMALGAMATING MILL.

No. 11,180. Reissued July 28, 1891.

WITNESSES:

George Baumann

John Revell

INVENTOR

Middleton Crawford

BY Howson and Howson

His ATTORNEYS.

3 Sheets—Sheet 2.

M. CRAWFORD.

GRINDING AND AMALGAMATING MILL.

No. 11,180. Reissued July 28, 1891.

WITNESSES:

George Baumann

John Revell

INVENTOR

Middleton Crawford

BY Howson and Howson his ATTORNEYS.

3 Sheets—Sheet 3.

M. CRAWFORD.

GRINDING AND AMALGAMATING MILL.

No. 11,180. Reissued July 28, 1891.

WITNESSES:

George Baumann

John Revell

INVENTOR

Middleton Crawford

BY Howson and Howson his ATTORNEYS.

UNITED STATES PATENT OFFICE.

MIDDLETON CRAWFORD, OF LIVERPOOL, ENGLAND.

GRINDING AND AMALGAMATING MILL.

SPECIFICATION forming part of Reissued Letters Patent No. 11,180, dated July 28, 1891.

Original No. 433,163, dated July 29, 1890. Application for reissue filed June 25, 1891. Serial No. 397,380.

*To all whom it may concern:*

Be it known that I, MIDDLETON CRAWFORD, engineer, a subject of the Queen of Great Britain and Ireland, residing at 3 Oxford Street, Liverpool, in the county of Lancaster, England, have invented a certain Improved Grinding and Amalgamating Mill, of which the following is a specification.

The principal object of my invention is to provide an apparatus which will very efficiently and rapidly grind ores preparatory to the separation therefrom of gold and silver, the grinding being effected in such a way that while the amalgamation of the gold and silver is greatly facilitated the sulphur and sulphur compounds and other impurities are automatically separated and expelled.

Figure 1:
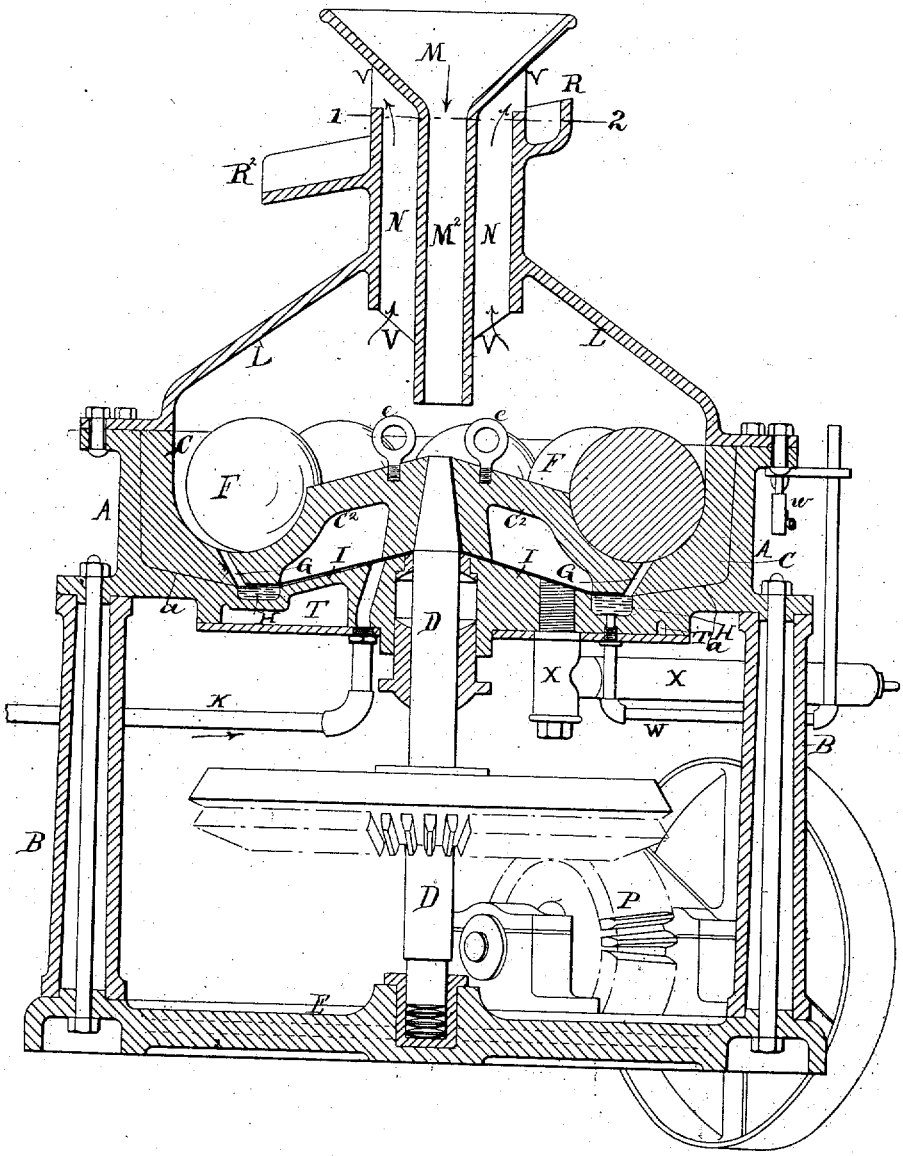
Figure 2:
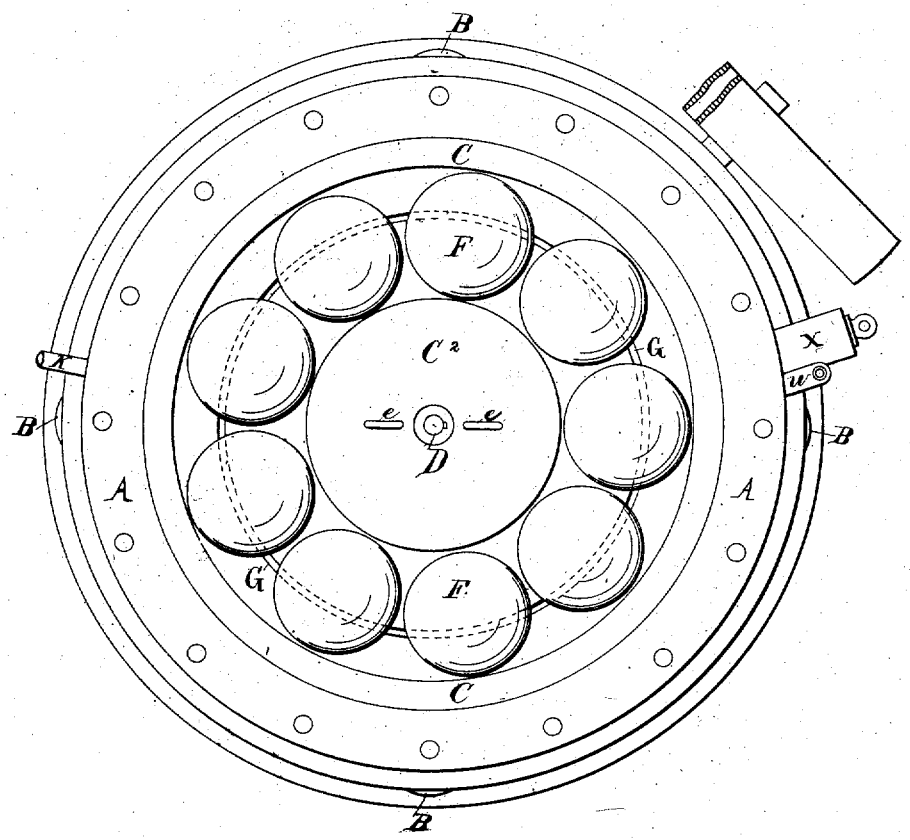
Figure 3:
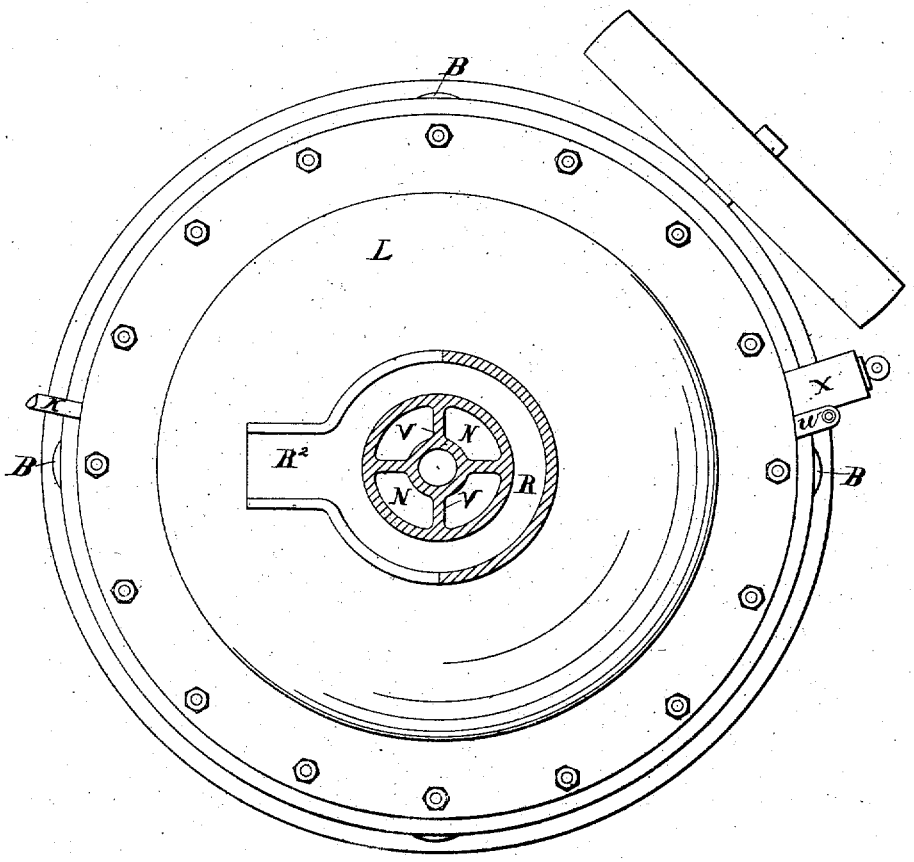

Figure 1 represents in vertical section, and Fig. 2 in plan, with the upper casing removed, an apparatus constructed according to my invention; and Fig. 3 is a horizontal section taken along the line 1 2, Fig. 1, through the ore-feeding and refuse-delivering passages.

A is a case or chamber, preferably of cast-iron, which may conveniently be supported on pillars B, and which contains the grinding surface or path C $C^2$. The part C of the grinding-surface is fixed in the casing A, and is consequently stationary, and the part $C^2$ is rotatory, it being keyed onto or otherwise removably secured to the upper end of a vertical shaft or spindle D, supported at the lower end in a step-bearing E and at the upper part in a bearing and stuffing-box $E^2$ in the bottom of the case A. The grinding surface or path C $C^2$ is concave and on it is supported a number of free balls F, which effect the grinding operation between themselves and the grinding surface or path C $C^2$ by reason of the rotary motion of the part $C^2$ and the movement consequently imparted to the balls. Between the parts C and $C^2$ of the grinding surface or path a space G is left, communicating with an annular trough or recess H, formed in the bottom of the casing A to contain mercury. The bottom of the casing A and the bottom of the part C are preferably inclined, as at *a a*, to allow any mercury which may find its way between them to return to the trough. A space I is provided between the bottom of the casing A and the portion $C^2$ of the grinding-path for the passage of water or other liquid admitted thereto under pressure by a pipe K. The case A is provided with a hood or cover L, to which the feeding-hopper M and the discharge-passage or passages N for the refuse are connected. Eyes *e* may be screwed into the rotating part $C^2$, as shown, for convenience in handling in putting the machine together or taking it apart.

The shaft D and portion $C^2$ of the grinding path are rotated from any suitable prime mover by any suitable gear or driving device, such as by means of a driving-strap passing around a driving-pulley fast on the shaft D, or by means of gear-wheels P P, as shown.

When the apparatus is in operation, the material fed in at the hopper M passes down the pipe or passage $M^2$ to between the balls F and grinding-surface C $C^2$, and is there ground. Water or other liquid under pressure is passed by the pipe K into the space I beneath the rotating portion $C^2$ of the grinding-surface, the water or liquid passing thence up through the space G and between the grinding-balls and the grinding-surface into the space inclosed by the casing L above and eventually out by the outlet or outlets N, over the upper edge of which outlet it flows into an annular trough R, and is conducted thence by the spout $R^2$ away from the apparatus. The space in the casing between the balls and the hood or cover L allows the water to separate the gangue and impurities, which pass away with the water or liquid at the outlet, while the heavier portions, likely to contain precious metal, return to between the grinding-surface C $C^2$ and the balls F to be further acted upon.

Beneath the casing A a cavity or chamber T may be provided, into which a heating agent—such as steam—may be admitted by a pipe (not shown) for the purpose of heating the water or liquid and mercury, when required. The outlet N is provided with partitions or baffle-plates V to prevent the heavier portions of the material being carried away with the refuse by undue agitation of the water caused by the rotating action of the part $C^2$ of the grinding-surface. The gold or other precious metal separated from the ore passes through the space G into the mercury contained in the trough or recess H, while the refuse crushed ore is carried away by the water or liquid through the outlet above, as hereinafter described.

The mercury containing the precious metal is discharged from the trough H through the pipe W, and is treated in the usual manner to obtain the precious metal.

To prevent tampering with the mercury, the pipe W may be fitted so that its outlet end can be turned up and secured by a lock, as at *w*, which, when the mercury charged with the precious metal is to be withdrawn, can be unlocked, so as to leave the pipe W free to be turned down for discharging the mercury.

X is a pipe, which can be closed by a plug or otherwise, and by withdrawing this plug the contents of the mill can be passed off, when desired, to prevent clogging, for instance, when the mill stops. By passing an air-current instead of water through the apparatus it may be used for dry grinding.

I claim as my invention—

1. In a grinding-mill, the combination of free or loose balls, an annular track or grinding-surface divided into two parts arranged one within the other and separated at the bottom by an annular discharge-opening, with a mercury-container beneath it, the outer part of the track being fixed and the inner part being adapted to rotate, with means for supplying air or liquid under pressure, and a baffled outlet above, all substantially as described.

2. A grinding-mill having an annular concave grinding surface or track, consisting of an outer stationary part and an inner rotating part, in combination with free or loose balls which can come into contact with each other and which are supported and move on the stationary and rotating parts of the concave track, substantially as set forth.

3. A grinding-mill having an annular concave grinding surface or track, consisting of an outer stationary part and an inner rotating part, with an annular discharge-opening at the bottom between the two parts, and a trough or recess below containing mercury, in combination with free or loose balls which can come into contact with each other and which move on the stationary and rotating parts of the concave track, substantially as set forth.

4. A grinding-mill having an annular concave grinding surface or track, consisting of an outer stationary part and an inner rotating part, with an annular discharge-opening between the two parts, a mercury trough or recess below, and a water-supply to a chamber below the grinding-surface and thence to the grinding-surface, in combination with a steam or other heating cavity below both the water-chamber and the mercury-trough, all substantially as described.

5. The combination of the grinding-surface, consisting of an inner rotating part and an outer fixed part, and free or loose balls moving on the concave formed by the two, with an inclosing-casing having an inlet-funnel at the top, and an overflow-discharge around this funnel containing partitions, and means for supplying air, water, or other fluid under pressure between the grinding-surfaces, all substantially as described.

In testimony whereof I have signed my name to this specification in the presence of two subscribing witnesses.

MIDDLETON CRAWFORD.

Witnesses.
EDWD. GEO. DAVIES,
CHAS. MILLS,
*Both of 47 Lincoln's Inn Fields, London, W. C.*